June 4, 1963    S. B. COHN    3,092,771
BROADBAND TRANSMIT-RECEIVE DEVICE
Filed Dec. 28, 1954

INVENTOR
SEYMOUR B. COHN
BY
ATTORNEY

3,092,771
BROADBAND TRANSMIT-RECEIVE DEVICE
Seymour B. Cohn, Palo Alto, Calif., assignor to Sperry
Rand Corporation, a corporation of Delaware
Filed Dec. 28, 1954, Ser. No. 478,007
18 Claims. (Cl. 325—24)

This invention relates to a broadband transmit-receive device.

A jamming equipment employed to interfere with the successful operation of enemy radar may transmit a broadband of frequencies including the frequency used by the radar. The jamming will result in an indication on the radar display component and the radar operator may shift to another frequency outside the band of jamming frequencies. The jamming equipment may therefore be provided with a "look-through" feature including a receiver for receiving the radar search pulses and indicating the frequency thereof so that the jamming frequency may be adjusted to again include the radar frequency.

The jamming transmitter must be stopped during the "look-through" operation to permit the associated receiver to effectively receive and indicate the radar frequency. Since it is highly desirable to have only one antenna for the jamming equipment, a transmit-receive device may be provided to alternately connect the transmitter or the receiver to the antenna.

The transmit-receive devices conventionally used for connecting a transmitter and receiver alternately to a common antenna in radar devices is the gaseous tube employed in a resonant circuit. However, such transmit-receive devices will not operate successfully in the jamming equipment described above because of the broadband characteristics of the transmitted jamming and received signals.

It is an object of this invention to provide a broadband transmit-receive device.

It is an object of this invention to provide a fast-acting mechanical switch for alternately connecting each of two wave guides to a third.

It is an object of this invention to provide a mechanical transmit-receive device creating a minimum of reflections in the circuit.

It is an object of this invention to provide a mechanical transmit-receive device having a minimum of inertia in the movng parts.

It is an object of this invention to provide a mechanical transmit-receive device which can operate at a rapid but aperiodic rate.

It is an object of this invention to provide a mechanical transmit-receive device for alternately connecting each of two wave guides to a third and in which the unconnected wave guide is completely cut off from transmitting power into the third wave guide.

This invention achieves the above-mentioned objects by providing a broadband transmit-receive device in which two wave guides are each alternately connected to a third wave guide by an axially shifting shutter, the stem of which constitutes the inner conductor of a coaxial line.

Other advantages and objects of this invention will occur to those skilled in the art from a consideration of the following specification taken in connection with the accompanying drawing in which FIG. 1 shows a system partly in section and partly schematic embodying this invention.

Figure 1:
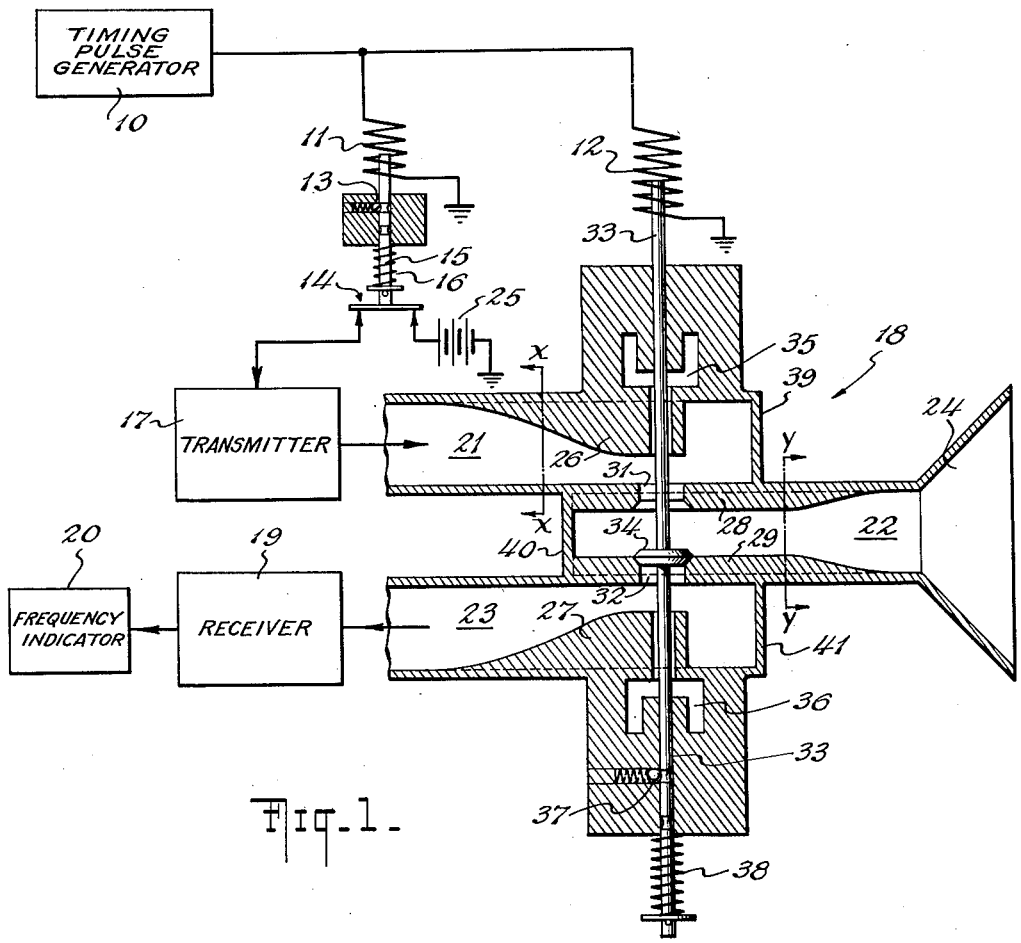

Timing pulse generator 10 provides a series of pulses which may have a pulse repetition rate in the order of one a second or which may be completely at random. The pulses may have a duration in the order of 10 or 20 milliseconds. The output of timing pulse generator 10 is connected to solenoids 11 and 12.

The core of solenoid 11 is one end of shaft 15. The other end of shaft 15 carries switch member 14 which in its down position connects transmitter 17 to a source of operating potential which may be battery 25. Shaft 15 is resiliently urged in either of its extreme positions of axial movement by a spring loaded ball bearing 13 which engages in either of two annular grooves carried by the shaft 15. Spring 16 holds shaft 15 in its down position except when solenoid 11 is energized.

The output of transmitter 17 is coupled to wave guide 21, which is a part of transmit-receive device 18. Transmit-receive device 18 also includes wave guides 22 and 23. Wave guide 22 is connected to a radiating and receiving means such as horn 24. Wave guide 23 is conected to receiver 19 which in turn is connected to frequency indicator 20 which may include a cathode ray tube directly indicating the frequency received. Wave guides 21, 22 and 23 are hollow, of rectangular cross section (except as modified by the internal ridges 26, 27, 28 and 29 described below), and are constructed of a good electrical conductor. Wave guide 22 is positioned between wave guides 21 and 23 and these three wave guides are secured in a fixed position relative to each other. While FIG. 1 shows the wave guides 21, 22 and 23 secured together by integral construction and with their longitudinal axes in a single plane, it will be obvious that other constructions are possible. Wave guides 21, 22 and 23 are terminated in short-circuiting transverse walls 39, 40 and 41, respectively. FIG. 1 of the drawing shows the open ends of wave guides 21 and 23 extending in a direction opposite to that of the open end of wave guide 22, but it will also be obvious that this relation is not a necessary one.

Figure 2:
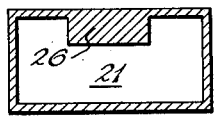
FIG. 2 shows a cross-section taken along the line X—X of FIG. 1.
Figure 3:
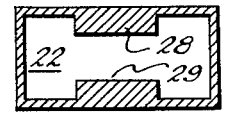
FIG. 3 shows a cross-section taken along the line Y—Y of FIG. 1.

Wave guides 21 and 23 each have a single impedance matching ridge 26 and 27 respectively centered in their broad wall most remote from the central wave guide 22. FIG. 2 shows ridge 26 of wave guide 21 in cross section. The ridge 27 of wave guide 23 is identical therewith. Wave guide 22 has two impedance matching ridges 28 and 29, one ridge centered on each broad wall as shown in FIG. 3. Ridges 26–29 taper or are stepped in a manner well known in the art, to a decreasing cross-section as they extend toward the open ends of their respective wave guides.

An aperture 31, round in cross-section, extends through the adjacent broad walls of wave guides 21 and 22 and through ridge 28. Another aperture 32 round in cross-section extends through the adjacent broad walls of wave guides 22 and 23 and through ridge 29. Apertures 31 and 32 are axially aligned. Apertures 31 and 32 have a diameter of smaller dimension than the width of ridges 28 and 29 through which they extended.

A shaft 33 extends through wave guides 21, 22 and 23 passing through the axially aligned apertures 31 and 32. Fixed to shaft 33 is a round, valve-like, electrically conducting, shutter element 34 which is fixed to the portion of shaft 33 passing through the wave guide 22. The periphery of the shutter 34 is beveled from both sides, and the ends of apertures 21 and 32 leading into wave guide 22 are beveled to conform therewith. Shaft 33 extends through the outer broad walls of wave guides 21 and 23. Chokes 35 and 36 are employed to prevent the leakage of power out of the wave guides past the end of the shaft 33 and also to provide a non-erratic, low impedance gap where shaft 33 emerges from the ridges 26 and 27.

A spring-loaded ball bearing 37 is provided which engages in either of two grooves in the shaft 33 when the shutter 34 is at either of its extreme positions. A spring 38 holds the shaft 33 in its down position except when the solenoid 12 is energized.

In the operation of the device above described, the timing generator 10 provides a pulse at the time when it is desired to "look through" or stop the transmitter and indicate received frequencies. Except when the pulse is provided by timing pulse generator 10, solenoids 11 and 12 are unenergized and shafts 15 and 33 are in their down positions. Transmitter 17 is energized and supplies a continuous wave, or series of pulses, of high power, radio energy including a broadband of frequencies to wave guide 21. The power flows from wave guide 21 through the coaxial line formed by aperture 31 and shaft 33 into the wave guide 22. This power flows through the wave guide 22 and is radiated through space by the horn 24. The shutter 34 effectively blocks the aperture 32 and no power flows into the receiver 19. The receiver 19 would be immediately burned out if any appreciable portion of the power of transmitter 17 were allowed to be conducted thereto. Moreover, the transmitter 17 might be damged if it fed its power into a short-circuited guide.

When a timing pulse is generated by component 10 to provide for the "look-through" period, solenoids 11 and 12 are energized and a magnetic pull builds up on the shafts 15 and 33. The axial movement of these shafts is resisted by the operation of ball bearings 13 and 37 and the grooves in which they engage. After a short finite interval, the retaining power of the ball bearings 13 and 37 is overcome and shafts 15 and 33 both snap upward and into their up position in which ball bearings 13 and 37 engage in the lower grooves of shafts 15 and 33, respectively.

As soon as shaft 15 begins to move upwardly, operating potential is removed from transmitter 17 and the powerful radio jamming energy is no longer fed into wave guide 21 so that, when shutter 34 opens the aperture 32 by an appreciable amount, no transmitter power is applied to the receiver 19. When shutter 34 reaches its extreme upper position, it closes aperture 31 and all of the power received from the radar apparatus by horn 24, which now acts as a receiving antenna, is applied to the receiver 19. The frequency of the radar apparatus is indicated on component 20.

At the end of the duration of the timing pulse the solenoids 11 and 12 are deenergized and springs 16 and 38 pull shafts 15 and 33, respectively, to their down positions, disconnecting the power coupling between wave guides 22 and 23, opening the coupling aperture 31 between wave guides 21 and 22, and enregizing transmitter 17.

It would be possible to construct the transmit-receive device with the central conductor corresponding to shaft 33 fixed in a stationary position and with the shutter 34 slidable thereon, mechanical or magnetic means being provided to move the shutter from one seat to the other. It will be obvious that the plane containing the axis of the shaft 33 and the longitudinal axis of any of the wave guides 21, 22 and 23 may be disposed at any angle relative to the corresponding plane of another wave guide.

It will also be understood that while the transmit-receive device 18 has been shown in a "look-through" system, it may be used in any system where it is desired to connect one wave guide alternately to two others. Device 18 could be advantageously used as a lobe-switching means in a radar antenna, the radio-frequency energy from the transmitter being fed into wave guide 22 and alternately connected to wave guides 21 and 23 which are respectively connected to two separate antenna means having non-congruent radiation patterns.

Since many changes could be made in the above construction and may apparently widely different embodiments of this invention could be made without departing from the scope thereof, it is intended that all matter contained in the above description or shown in the accompanying drawings shall be interpreted as illustrative and not in a limiting sense.

What is claimed is:

1. A wave guide switching device including first, second and third wave guides, a first means including an aperture connecting said first and second wave guides, a second means including an aperture connecting said second and third wave guides, central conductor means mounted for passing through said apertures, said first and second means and said central conductor means constituting at least part of first and second coaxial lines, said first coaxial line connecting said first and second wave guides and said second coaxial line connecting said second and third wave guides, and shutter means mounted on said central conductor means and movable axially of said central conductor means, said shutter means being adapted to close either of said apertures.

2. The wave guide switching device of claim 1 in which means are provided to move the shutter means axially back and forth so as to alternately open and close each of said apertures.

3. The wave guide switching device of claim 1 in which at least one impedance matching ridge is provided in each of said wave guides, each of said apertures extending through two of said ridges.

4. A wave guide switching device including first, second and third wave guides, a first means including an aperture connecting said first and second wave guides, a second means including an aperture connecting said second and third wave guides, shaft means mounted for axial movement and passing through said apertures, said first and second means and said shaft constituting at least part of first and second coaxial lines, said first coaxial line, said first coaxial line being adapted to couple power between said first and second wave guides and said second coaxial line being adapted to couple power between said second and third wave guides, and a shutter means fixed to said shaft and adapted to close either of said apertures.

5. The wave guide switching device of claim 4 in which means are provided to move said shaft means back and forth axially to alternately close each of said apertures and in which resilient means are provided which tend to maintain said shutter means in either of its positions in which it closes one of said apertures.

6. The wave guide switching device of claim 4 in which means are provided to move the shaft means back and forth so as to alternately open and close each of said apertures and in which transmitting means, antenna means and receiving means are respectively connected to said first, second and third wave guides and in which timing means are provided to control the movement of said shaft and to operate the transmitter only when the aperture connecting said second and third wave guides is closed by said shutter.

7. A wave guide switching device including first, second and third wave guides, a coaxial line connecting said first and second wave guides and a coaxial line connecting said second and third wave guides, the inner conductor of said coaxial lines being a shaft extending through said second wave guide and into said first and third wave guides, the portion of said shaft within said second wave guide carrying a shutter adapted to close the ends of either of the coaxial lines connecting into the second wave guide.

8. The switching device of claim 7 in which means are provided to axially move said shaft so as to alternately close the ends of said coaxial lines connecting with said second wave guides.

9. The switching device of claim 7 in which said second wave guide has two oppositely mounted impedance matching ridges and in which the ends of the coaxial lines connecting into the second wave guide are each constituted by an aperture extending through one of the impedance matching ridges and having a diameter less than the width of the ridge.

10. A wave guide switching device including first, second and third wave guides, a first means including an aperture connecting said first and second wave guides, a first portion of a shaft extending through said first aperture so that said first aperture and said first shaft portion are adapted to constitute a coaxial line for coupling power between said first and second wave guides, a second means including an aperture connecting said second and third wave guides, a second portion of a shaft extending through said second aperture so that said second aperture and said second shaft portion are adapted to constitute a coaxial line for coupling power between said second and third wave guides, conducting shutter means associated with both of said shaft portions, means for axially moving both of said shaft portions back and forth axially to alternately close and open each of said apertures so that one is opened when the other is closed.

11. A transmit-receive device comprising a wave guide assembly including first, second and third wave guides comprising a wave guide assembly, each of which are rectangular in cross section, the second wave guide being between the first and third wave guides, said second wave guide being provided with two impedance matching ridges, one extending from each of the walls adjacent the first and second wave guides, there being a circular aperture having a diameter of smaller dimension than the width of said ridges extending through each of said ridges and respectively connecting said second wave guide with each of said first and third wave guides, said apertures being in axial alignment, an axially movable shaft extending through said apertures and carrying a disc-like shutter fixed to the portion of the shaft extending through said second wave guide, said apertures and said shaft constituting at least part of two coaxial lines connecting said second wave guide with said first and second wave guides, at least one end of said shaft extending to the exterior of said wave guide assembly, said aperture and said shutter being arranged so that with the shaft in one position, the shutter will close one aperture in said second wave guide, and in another position will close the other aperture in said second wave guide.

12. The combination of claim 11 in which means are provided for resiliently urging said shaft in either of said two positions.

13. The combination of claim 11 in which means are provided for moving said shaft axially from one to the other of said two positions.

14. A system in which there is provided a radio pulse transmitter, a radio pulse receiver antenna means and a transmit-receive device for alternately connecting said transmitter and said receiver to said antenna means, said transmit-receive device having a first wave guide connected to said transmitter, a second wave guide connected to said antenna means and a third wave guide connected to said receiver, said first, second and third wave guides having juxtaposed portions, an aperture in said first wave guide being connected to an aperture in a wall of said second wave guide, an aperture in an opposite wall of said second wave guide being connected to an aperture in an adjacent wall of said third wave guide, said apertures being in axial alignment, an axially movable shaft passing through said apertures and concentric therewith, two coaxial lines being constituted by means including said apertures and said shaft, said coaxial lines connecting said second wave guide with said second and third wave guides, a shutter fixed on said shaft and arranged to close one aperture in said second wave guide with the shaft in one position and to close the other aperture in said second wave guide with the shaft in the other position, means to axially move said shaft, and timing means to synchronize the operation of said transmitter and said moving means.

15. The combination of claim 14 in which means are provided to resiliently urge said shaft in either of said two positions.

16. A wave guide switching device including first and second wave guides, first means including an aperture connecting said first and second wave guides, central conductor means passing through said aperture, a coaxial line connecting said first and second wave guides, said coaxial line being constituted, at least in part, by said aperture and said central conductor, shutter means mounted on said central conductor and movable in a direction along the axis of said central conductor to alternately open and close said aperture.

17. The wave guide switching device of claim 16 in which means are provided for moving said shutter means along said axis.

18. The wave guide switching device of claim 16 in which the shutter means is fixed to said central conductor means and in which means are provided for axially moving said central conductor means.

References Cited in the file of this patent
UNITED STATES PATENTS

| | | |
|---|---|---|
| 2,588,934 | Miller | Mar. 11, 1952 |
| 2,637,787 | Price | May 5, 1953 |
| 2,705,776 | Starr et al. | Apr. 5, 1955 |